United States Patent
Jansen et al.

(10) Patent No.: US 7,685,186 B2
(45) Date of Patent: Mar. 23, 2010

(54) OPTIMIZED AND ROBUST IN-PLACE DATA TRANSFORMATION

(75) Inventors: Ariane Jansen, Issaquah, WA (US); Andrew M. Rogers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 11/768,010

(22) Filed: Jun. 25, 2007

(65) Prior Publication Data

US 2008/0320252 A1    Dec. 25, 2008

(51) Int. Cl.
*G06F 17/30* (2006.01)
(52) U.S. Cl. .................................. 707/661; 707/822
(58) Field of Classification Search .............. 707/100, 707/101, 104.1, 200, 204; 711/161
See application file for complete search history.

(56) References Cited

U.S. PATENT DOCUMENTS

| | | | |
|---|---|---|---|
| 4,530,054 A | 7/1985 | Hamstra et al. | 711/133 |
| 5,189,608 A | 2/1993 | Lyons et al. | |
| 5,564,037 A * | 10/1996 | Lam | 711/161 |
| 5,734,894 A | 3/1998 | Adamson et al. | 707/200 |
| 6,604,183 B2 | 8/2003 | Beaven et al. | 711/170 |
| 7,007,029 B1 | 2/2006 | Chen | |
| 7,058,849 B2 | 6/2006 | Erstad | 714/5 |
| 7,093,194 B2 | 8/2006 | Nelson | |
| 7,124,244 B2 | 10/2006 | Shimada | 711/113 |
| 7,519,272 B2 * | 4/2009 | Park | 386/83 |
| 2004/0172326 A1 * | 9/2004 | Yeo et al. | 705/14 |
| 2004/0194015 A1 | 9/2004 | Hays et al. | |
| 2005/0216378 A1 | 9/2005 | Bickel et al. | |
| 2005/0286306 A1 | 12/2005 | Srinivasan et al. | 365/185.22 |
| 2006/0010156 A1 | 1/2006 | Netz et al. | |
| 2006/0047925 A1 | 3/2006 | Perry | 711/162 |
| 2006/0117057 A1 | 6/2006 | Legault et al. | |
| 2006/0230025 A1 | 10/2006 | Baelen | |
| 2006/0242182 A1 | 10/2006 | Palaniappan et al. | 707/101 |
| 2007/0061318 A1 | 3/2007 | Azizi et al. | |
| 2007/0061344 A1 | 3/2007 | Dickerman et al. | |
| 2007/0276951 A1 * | 11/2007 | Riggs et al. | 709/229 |

OTHER PUBLICATIONS

ORNL's TeraGrid, http://www.ornl.teragrid.org/guides/userguide.html, printed on May 14, 2007, 6 pp.

(Continued)

*Primary Examiner*—Cam-Linh Nguyen
(74) *Attorney, Agent, or Firm*—Merchant & Gould P.C.

(57) ABSTRACT

In-place data transformations are performed on file data by moving data blocks from a source file into a temporary file and then from the temporary file into a destination file each time in a back to front fashion enabling truncation of the source file while the temporary file is being expanded and written into. Similar read, write, and truncate operations are performed between the temporary and destination files as well resulting in optimized use of available disk and/or memory space. An initial log file with information such as source file name, size, transformation type and direction is generated for recovery from a mid-transaction interruption. Based on a state (truncation, data content) of the temporary and source files, a status of data transfer prior to interruption is determined and remaining data transferred.

17 Claims, 7 Drawing Sheets

OTHER PUBLICATIONS

Storage Consolidation and Archive Solutions Using DiskXtender and NearStore, http://www.netapp.com/library/tr/3177.pdf, Legato Systems and Network Appliance, Inc., Jul. 2002, 13 pp.

Beyond the Basics: Advanced OLAP Techniques http://www2.sas.com/proceedings/sugi31/219-31.pdf (pp. 1-10).

Reporting and Comparing Changes to Business Dimensions http://www.cubespace.com.au/edm_dimreporting.htm (pp. 1-28).

Getting Started with Reporting Services http://media.wiley.com/product_data/excerpt/87/07645687/0764568787.pdf (1 pg.).

* cited by examiner

OPTIMIZED AND ROBUST IN-PLACE DATA TRANSFORMATION

BACKGROUND

A file system, in computing, is an arrangement for storing and organizing computer files and the data they contain to make it easy to find and access them. File systems may use a data storage device such as a hard disk or CD-ROM and involve maintaining the physical location of the files, they might provide access to data on a file server by acting as clients for a network protocol, or they may be virtual and exist only as an access method for virtual data. Typical file systems make use of an underlying data storage device that offers access to an array of fixed-size blocks, sometimes called sectors. The file system software is responsible for organizing these sectors into files and directories, and keeping track of which sectors belong to which file and which are not being used.

For file systems that do not support sparse files (i.e. file systems without pointers to address such that blocks can be rearranged) lack a mechanism to transfer data from one file to another in low storage space situations. Challenges in such scenarios include: a change of state of the data (e.g. encrypted, compressed, or otherwise transformed); unpredictable extra space requirement for data and overhead (due to the nature of the transform); the restriction to write the data in-order rather than randomly throughout the file; and recovery from mid-transaction interrupts (e.g. power loss).

Some proposed solutions have their own disadvantages. For example, if the file is simply read into memory, the file deleted, and then written out, mid-transaction power loss may result in the data being lost. If the file is read one block at a time from the beginning, then written out to the new file, the space required is the sum of the old file and the new file sizes, which may be more than the space available on disk.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to performing data transformations on file data by moving data blocks from a source file into a temporary file and then from the temporary file into a destination file each time in a back to front fashion enabling truncation of the source (temporary) file while the temporary (destination) file is being expanded and written into. By generating an initial log file with information such as file names, sizes, and transformation type, data can be recovered from any interrupt during the transformation process. Moreover, a needed space for the transformation is optimized through the back to front expansion—truncation operations.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, data transformation between files may be performed by moving data blocks from a source file into a temporary file and then from the temporary file into a destination file each time in a back to front fashion enabling truncation of the source (temporary) file while the temporary (destination) file is being expanded and written into. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
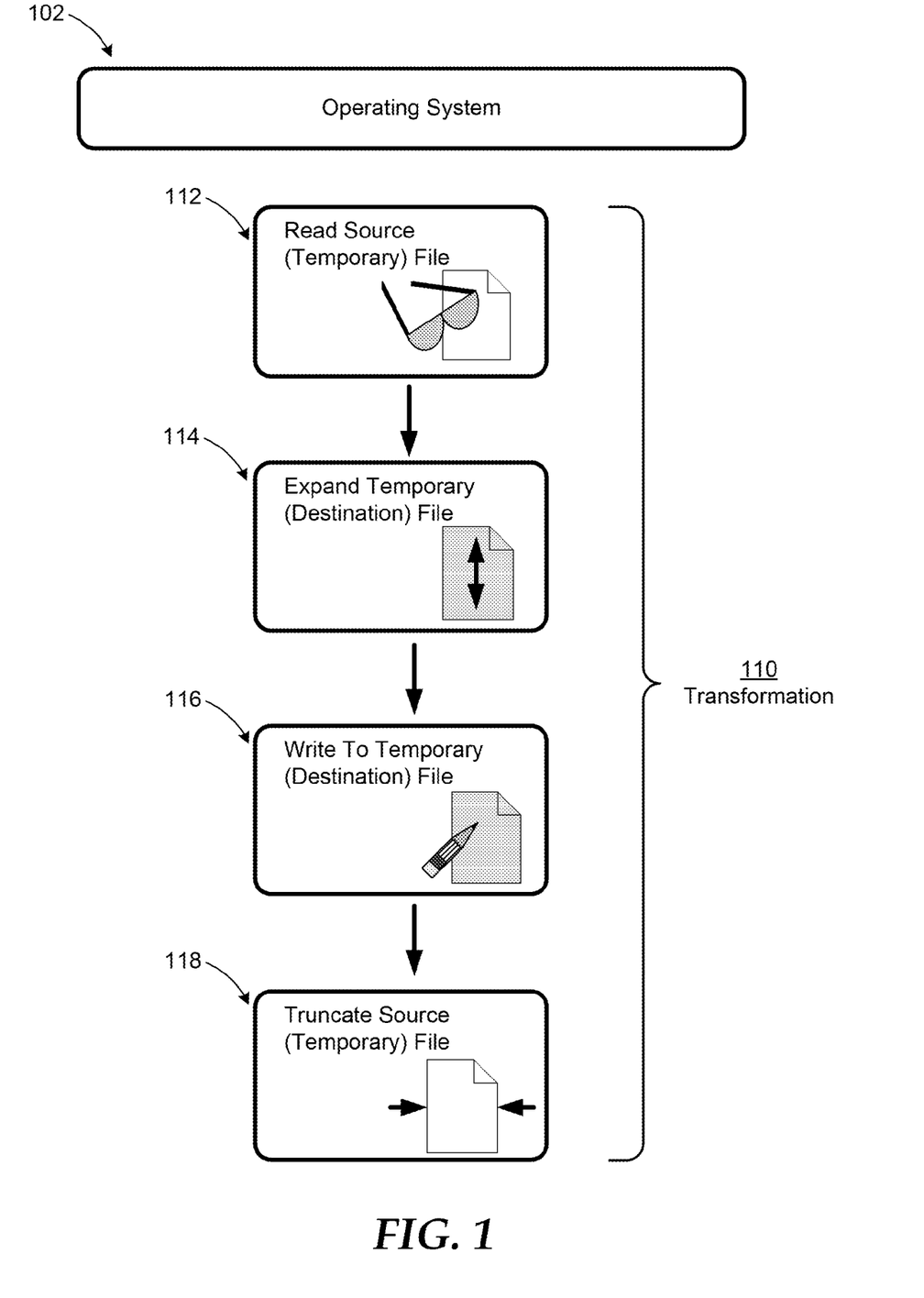
FIG. 1 is a conceptual diagram illustrating basic operations during transformation of data from a source (temporary) file to a temporary (destination) file.

Referring to FIG. 1, a conceptual diagram of basic operations during transformation of data from a source (temporary)

file to a temporary (destination) file is illustrated. While the basic operations during transformation of file data are shown between source, temporary, and destination files according to embodiments in FIG. 1, these operations are common to typical data transfer processes, where data is transferred in blocks.

File systems that transfer/transform data between files typically operate under an umbrella operating system (102) such as WINDOWS® operating systems of MICROSOFT CORP. of REDMOND, WA. A first operation in data transformation 110 is reading of the source file 112. As described in more detail below, a file system according to embodiments performs two sets of data transfer operations: first from the source file to a temporary file, then from the temporary file to a destination file. The transformation may take place during either one of these transfers. Thus, the reading operation 112 may also take place on the temporary file.

The second operation is expansion of the temporary (or the destination) file 114 such that transferred data can be written into it. In a prior operation, the temporary (or destination) file may be created, if it does not exist. The expansion operation 114 is followed by writing of the data to the temporary (or destination) file 116. As mentioned previously, typical file systems transfer file in a back to front fashion. Thus, the last data block in the source (temporary) file is written into the temporary (destination) file as the first block with the remaining blocks following the same back to front order.

Once the data block is written to the temporary (or destination) file, the source (or the temporary) file is truncated (118) to save space (volatile or non-volatile memory, hard disk, etc.). Following the truncation of the source (temporary) file, it is read again for the next data block and the same set of operations (112, 114, 116, and 118) are repeated until all data blocks in the source (temporary) file are transferred.

While the order of operations in FIG. 1 is important for a system or method of data transformation according to embodiments, the individual operations may be performed in any way known in the art. Furthermore, the processes described herein are applicable to any file type and data transformation that is based on transferring data blocks in a file system. For example, the data transformation may be encryption, decryption, compression, decompression, copying, format change, and so on. Similarly, the files may be text-based, image files, even audio or video data files, as long as the data is preserved in blocks.

The operations described above may be performed by a module or an application within the operating system individually or as a set. Different applications may perform individual of groups of operations in coordination (e.g. one application may read the data from the source file while another writes it to the destination file).

Figure 2:
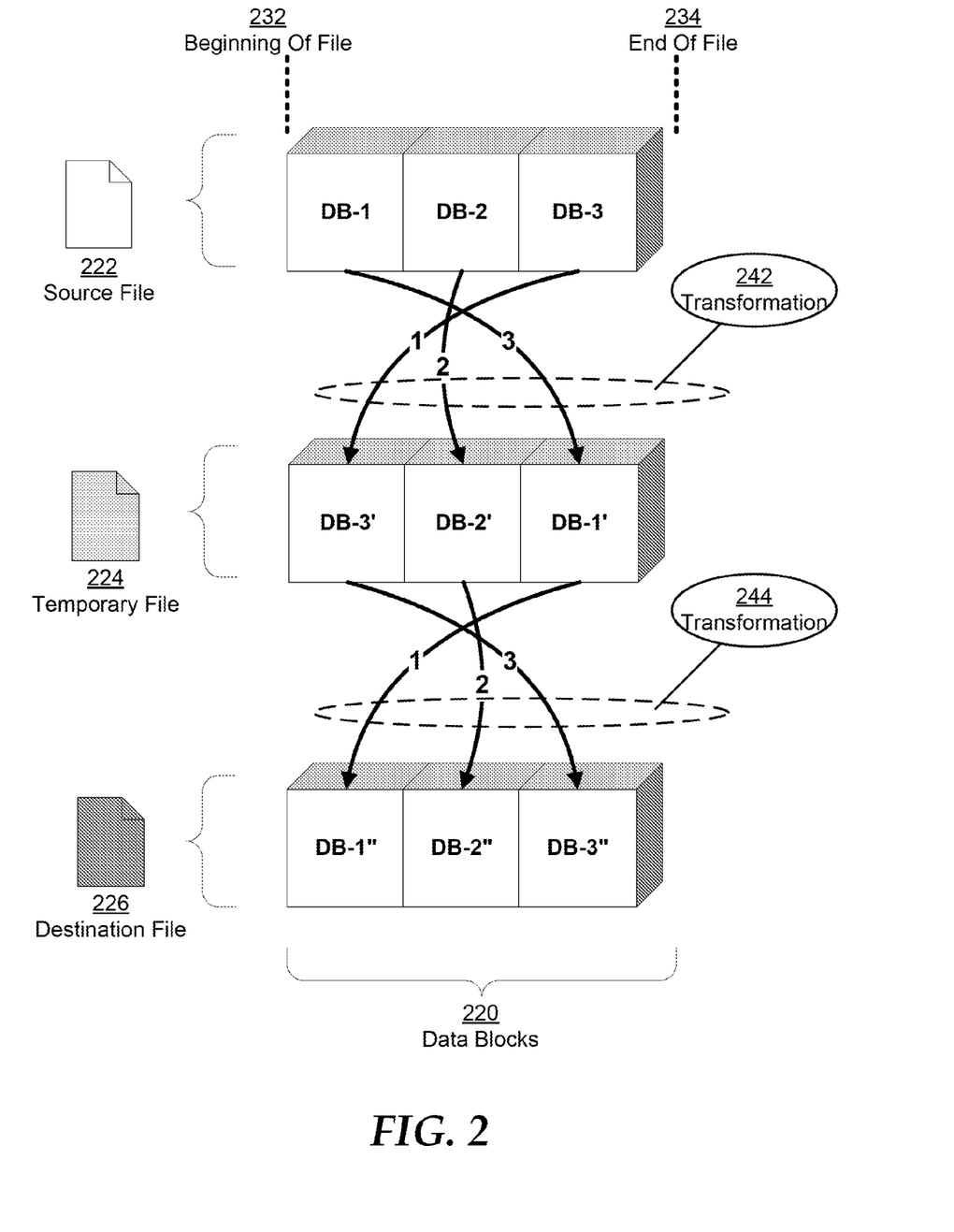
FIG. 2 illustrates an example data transformation process with data blocks being transferred back to front between source, temporary, and destination files.

FIG. 2 illustrates an example data transformation process with data blocks being transferred back to front between source, temporary, and destination files. As mentioned previously, a file system is an arrangement for storing and organizing computer files and the data they contain to make it easy to find and access them using a data storage device such as a hard disk or CD-ROM and maintaining the physical location of the files. The file system software is responsible for organizing sectors of the storage device into files and directories, and keeping track of which sectors belong to which file and which are not being used.

Whether a file system has an underlying storage device or not, file systems typically have directories which associate file names with files, usually by connecting the file name to an index into a file allocation table of some sort. Directory structures may be flat, or allow hierarchies where directories may contain subdirectories. In some file systems, file names are structured, with special syntax for filename extensions and version numbers. In others, file names are simple strings, and per-file metadata is stored elsewhere.

Other bookkeeping information is typically associated with each file within a file system. The length of the data contained in a file may be stored as the number of blocks allocated for the file or as an exact byte count. The time that the file was last modified may be stored as the file's timestamp. Some file systems also store the file creation time, the time it was last accessed, and the time that the file's meta-data was changed. Other information may include the file's device type (e.g. block, character, socket, subdirectory, etc.), its owner user-ID and group-ID, and its access permission settings (e.g. whether the file is read-only, executable, etc.).

Traditional file systems offer facilities to truncate, append to, create, move, delete, and in-place modify files. They do not offer facilities to prepend to or truncate from the beginning of a file. Arbitrary insertion into or deletion from a file is also not typically allowed by traditional file systems. The operations provided are highly asymmetric as discussed above in conjunction with FIG. 1.

Thus, in an environment, where data transfer is limited to whole blocks and in a predefined order, data transformation may be performed in two sequential sets of transfer operations to optimize use of available space and provide robust recovery from interruptions mid-transaction. First, data may be transferred in blocks from the source file (222) into a temporary file (224). As each block is transferred, the source file 22 may be truncated to reclaim disk space. The blocks are written to the temporary file 224 in reverse order since the file system only allows truncation or deletion of related blocks from the end of each file. Second, data is transferred from the temporary file 224 to destination file 226 in the same fashion as between the source and temporary files. The temporary file 224 is also truncated as each block is transferred with the blocks being written into the destination file 226 in reverse order. Thus, when the operations are completed, the order of blocks in the destination file is the same as in the original source file. Moreover, at any given time, the required space is the larger of the source and the temporary files plus one block size (as well as space for overhead if needed by the transformation), but not twice the file size. The space for the extra block size is needed because data is written into the destination file before being truncated from the source file. Upon completion of the operations, the source file and the temporary file are depleted. The actual transformation (e.g. encryption, decryption, compression, decompression, format change, and the like) may be performed either during the transfer from the source file to the temporary file or during the transfer from the temporary file to the destination file.

These operations are visualized in FIG. 2 by data blocks 220 for each of the three files. For example, data blocks DB-1, DB-2, and DB-3 are ordered within source file 222 from the beginning of file 232 to the end of file 234. The transferred blocks of temporary file 224 are ordered as DB-3', DB-2', and DB-1' from the beginning of file 232 to the end of file 234. Optionally, data transformation 242 may occur during the transfer of the blocks from source file 222 to temporary file 224.

After the second transfer operation, during which the transformation 244 may occur, the data blocks are ordered as DB-1", DB-2", and DB-3" from the beginning of file 232 to the end of file 234 of the destination file 226. Thus, a correct order of the data blocks is preserved.

Another aspect of a system according to embodiments is that it enables robust recovery of data when a mid-transaction interruption occurs. According to one embodiment, a temporary log file may be created and written once at the beginning with information such as source and destination file names, source file size, type of transformation and a destination of the transformation. If a mid-transaction interruption occurs, the status of the transformation may be determined from the initial log file and the data blocks written into the temporary file (or destination file).

From the source file size information, a number of data blocks to be transformed can be ascertained. Then, from the number of blocks in the temporary file (or the destination file), a determination can be made as to how many blocks still need to be transformed. According to another embodiment, the transformation operation may be restarted if only one or a few predefined number of blocks have been transformed at the time of the interruption.

If the source file and the destination file have data which correspond to each other (i.e. the write operation succeeded, but the transaction was interrupted before file truncation occurred) then the block in the destination file is overwritten. File Allocation Table (FAT) or similar file systems may pre-allocate the space before the data is written. Therefore, the data in the destination file may be invalid. Hence, rewriting the final block into the destination file may be necessary to prevent corruption.

Figure 3:
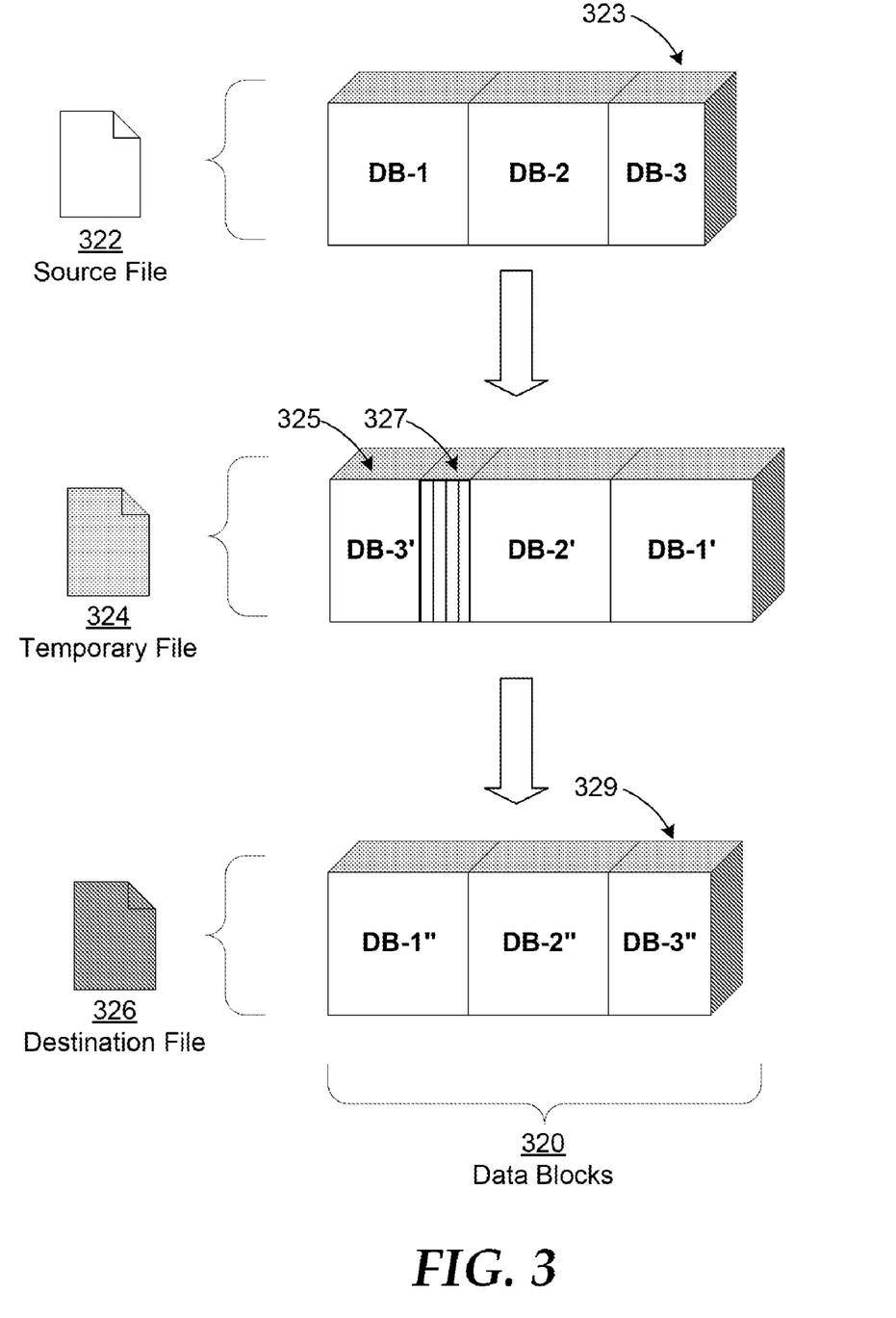
FIG. 3 illustrates another example data transformation process with data blocks being transferred back to front between source, temporary, and destination files, where the last data block in the source file is truncated.

FIG. 3 illustrates another example data transformation process with data blocks being transferred back to front between source, temporary, and destination files, where the last data block in the source file is truncated.

Typical file systems utilize uniform block sizes (i.e. each block within a file is the same size). However, some files may include a truncated last block. This is especially common in systems with large block sizes, where the last block may only contain data to fill a fraction of the block. In the figure, data block DB-3 (323) of source file 322 represents such a truncated block. When this data block is transferred to the first place in temporary file 324, however, it needs to be the same size as the rest of the blocks due to the uniform block size requirement.

Thus, the "empty" portion of the block 327 following the data 325 in DB-3' may be filled with a series of zeroes or ones (or any other predefined pattern). This way, the data integrity of the block sizes in temporary file 324 is preserved within the file system. When the second transfer happens to destination file 326, the last block 329 is again DB-3". At this point, the extra data in DB-3" may be removed or left in the block since it will be recognized as such.

Individual steps of the data transformation in a file system may be performed by a single or multiple software or hardware modules, or a combination of two. Embodiments are not limited to a single software module or hardware module implementation. Any combination of software and hardware may be used for implementing data transformation in a file system.

Figure 4:
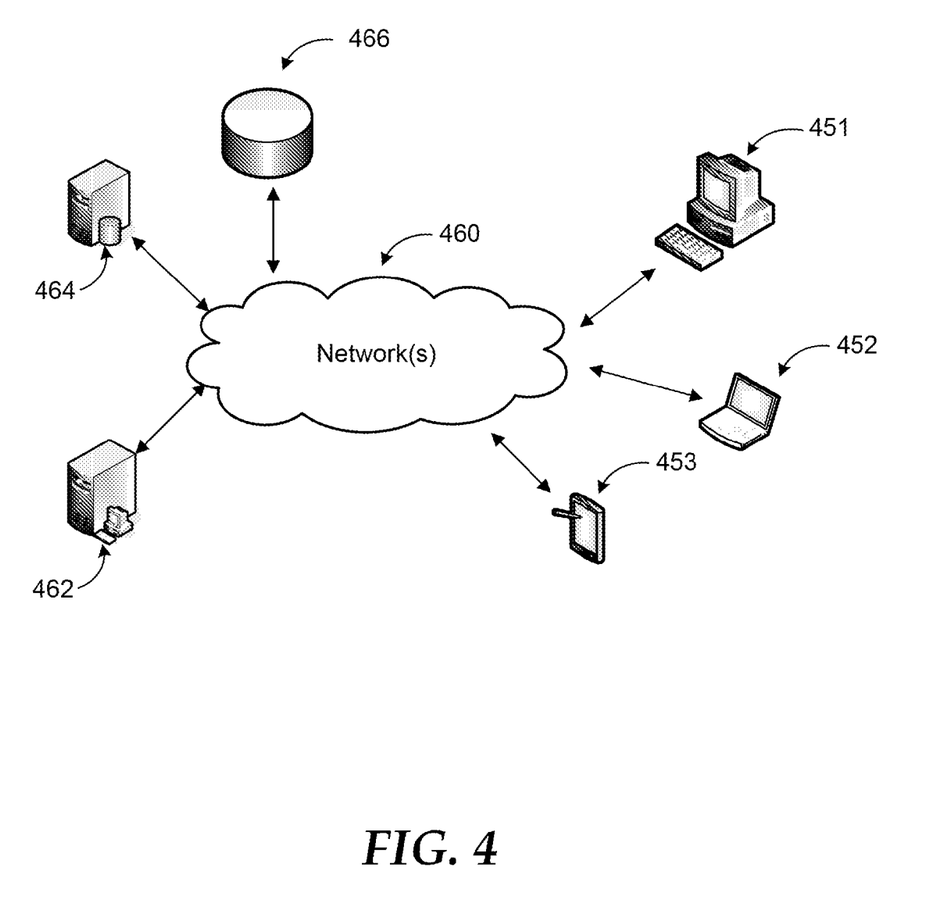
FIG. 4 is an example networked environment, where embodiments may be implemented.

FIG. 4 is an example networked environment, where embodiments may be implemented. Data transformation according to embodiments may be implemented locally on a single computing device. Files containing the data to be transformed may be received from one or more computing devices configured in a distributed manner over a number of physical and virtual clients and servers. They may also be implemented in un-clustered systems or clustered systems employing a number of nodes communicating over one or more networks (e.g. network(s) 460).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing data transformation may involve many more components, relevant ones are discussed in conjunction with this figure.

A transformation module according to embodiments may be implemented as part of any application that processes files such as an encryption/decryption application, a compression/decompression application, a format change application, and the like, in individual client devices 451-453. Parts or all of the application may also be implemented in server 462 and accessed from anyone of the client devices (or applications). Data stores associated with the source files to be transformed (or destination files) may be embodied in a single data store such as data store 466 or distributed over a number of data stores associated with individual client devices, servers, and the like. Dedicated database servers (e.g. database server 464) may be used to coordinate storage and/or retrieval of the files in one or more of such data stores.

Network(s) 460 may include a secure network such as an enterprise network, an unsecure network such as a wireless open network, or the Internet. Network(s) 460 provide communication between the nodes described herein. By way of example, and not limitation, network(s) 460 may include wired media such as a wired network or direct-wired connection, and wireless media such as acoustic, RF, infrared and other wireless media.

Many other configurations of computing devices, applications, data sources, data distribution systems may be employed to implement in-place data transformation according to embodiments. Furthermore, the networked environments discussed in FIG. 4 are for illustration purposes only. Embodiments are not limited to the example applications, modules, or processes.

Figure 5:
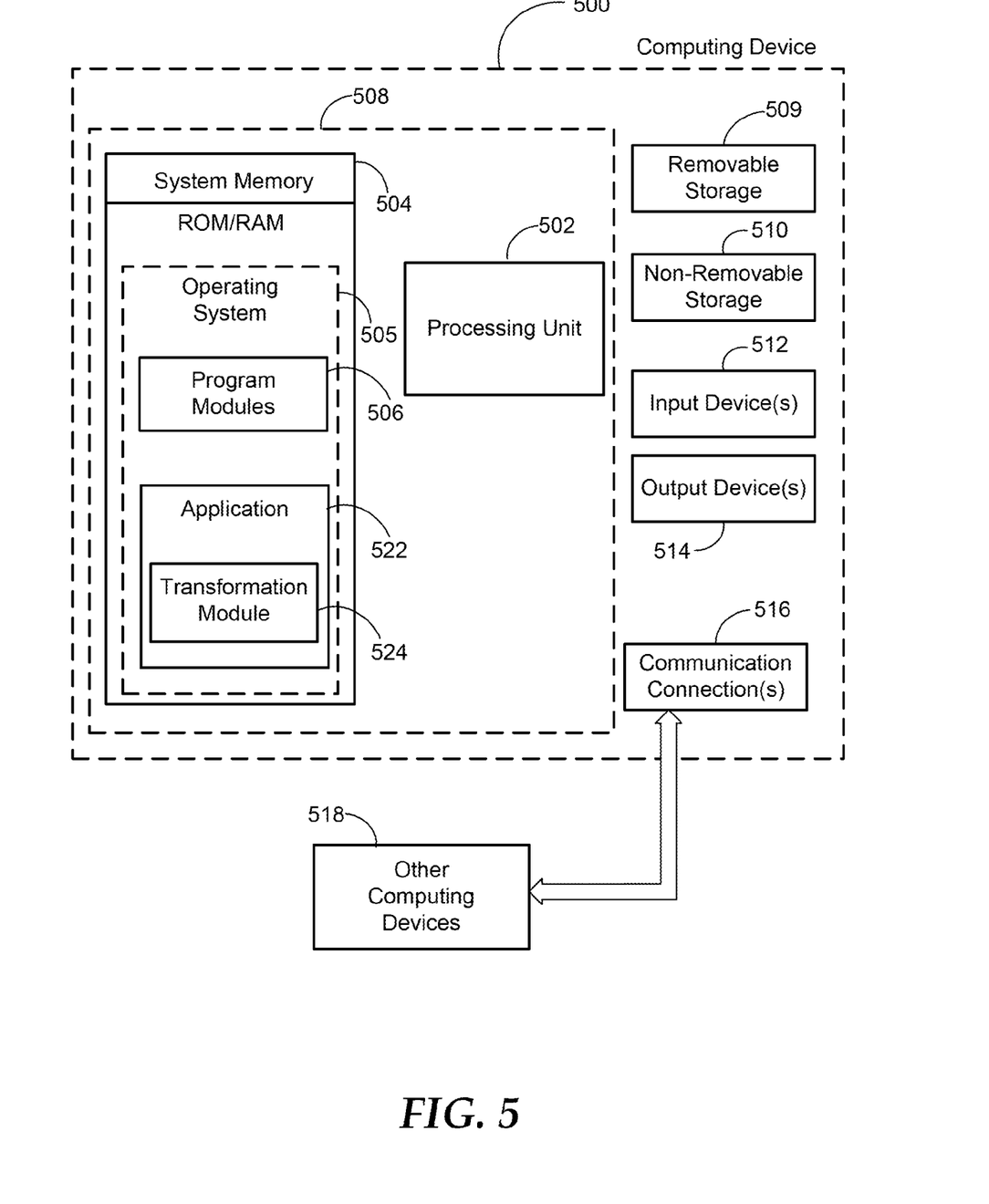
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server or a client machine. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, application 522 and transformation module 524.

Application 522 may be any application utilizing data transformation as part of its functionality. The data transformation process may also be executed by an integral module of a service or even operating system 505. Transformation module 524 performs transformation of the data while transferring the data from a source file to a destination file. According to some embodiments, a separate recovery module (not shown) may be implemented to recover data following a mid-transaction interruption. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that provide files for data transformation. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
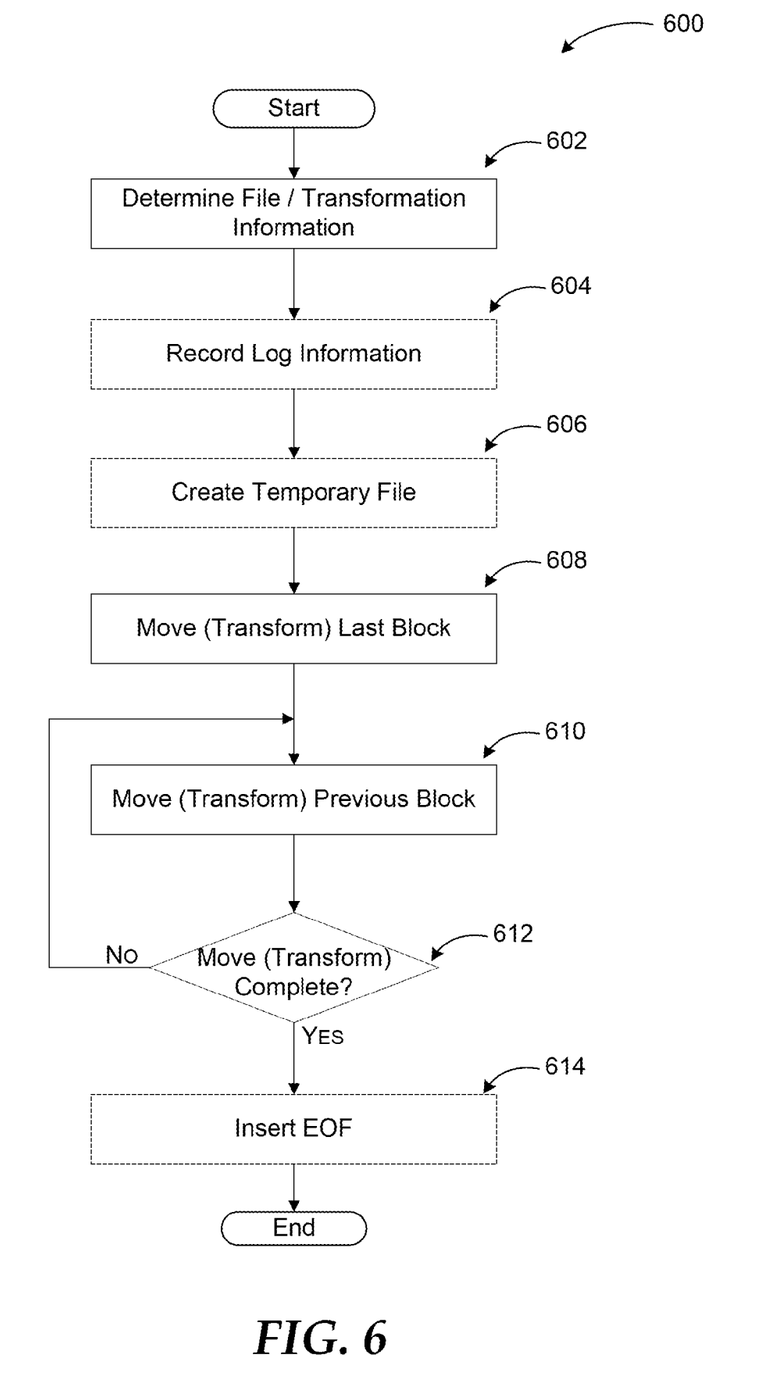
FIG. 6 illustrates a logic flow diagram of a data transformation process according to embodiments.

FIG. 6 illustrates a logic flow diagram of a data transformation process according to embodiments. Process 600 may be implemented as part of a transformation module in a file processing application.

Process 600 begins with operation 602, where source file information such as file name and file size and transformation type and/or direction is determined. Processing advances from operation 602 to optional operation 604. At optional operation 604, the log information such as file names, file sizes, and transformation type may be recorded. According to a preferred embodiment, a log file created at the beginning of the transformation process is sufficient to recover data if a mid-transaction interruption should occur. Processing moves from optional operation 604 to optional operation 606.

At optional operation 606, a temporary file is created for transferring data from the source file to the destination file. As discussed previously, data transformation according to embodiments includes transfer of data from the source file to the temporary file and then from the temporary file to the destination file. Operations 608 through 614 are, thus, repeated between the temporary file and the destination file. Processing continues to operation 608 from optional operation 606.

At operation 608, the last data block of the source file (temporary file in case of the second set of operations) is moved (and transformed) to the temporary (destination) file as the first block. The transformation may occur during either set of the transfers. Processing continues to operation 610 from operation 608.

At operation 610, the block before the last block is moved (and transformed) to the temporary (destination) file as the second block. Processing continues from operation 610 to decision operation 612.

At decision operation 612, a determination is made whether the move (and transformation) of data is complete. If the move (and transformation) is not complete yet, processing returns to operation 608 for moving (and transforming) yet another block in reverse order. If the move is complete, processing moves to optional operation 614, where an End-Of-File (EOF) is inserted to the temporary (destination) file indicating the file has been successfully written with the transformed data. After optional operation 614, processing moves to a calling process for further actions.

Figure 7:
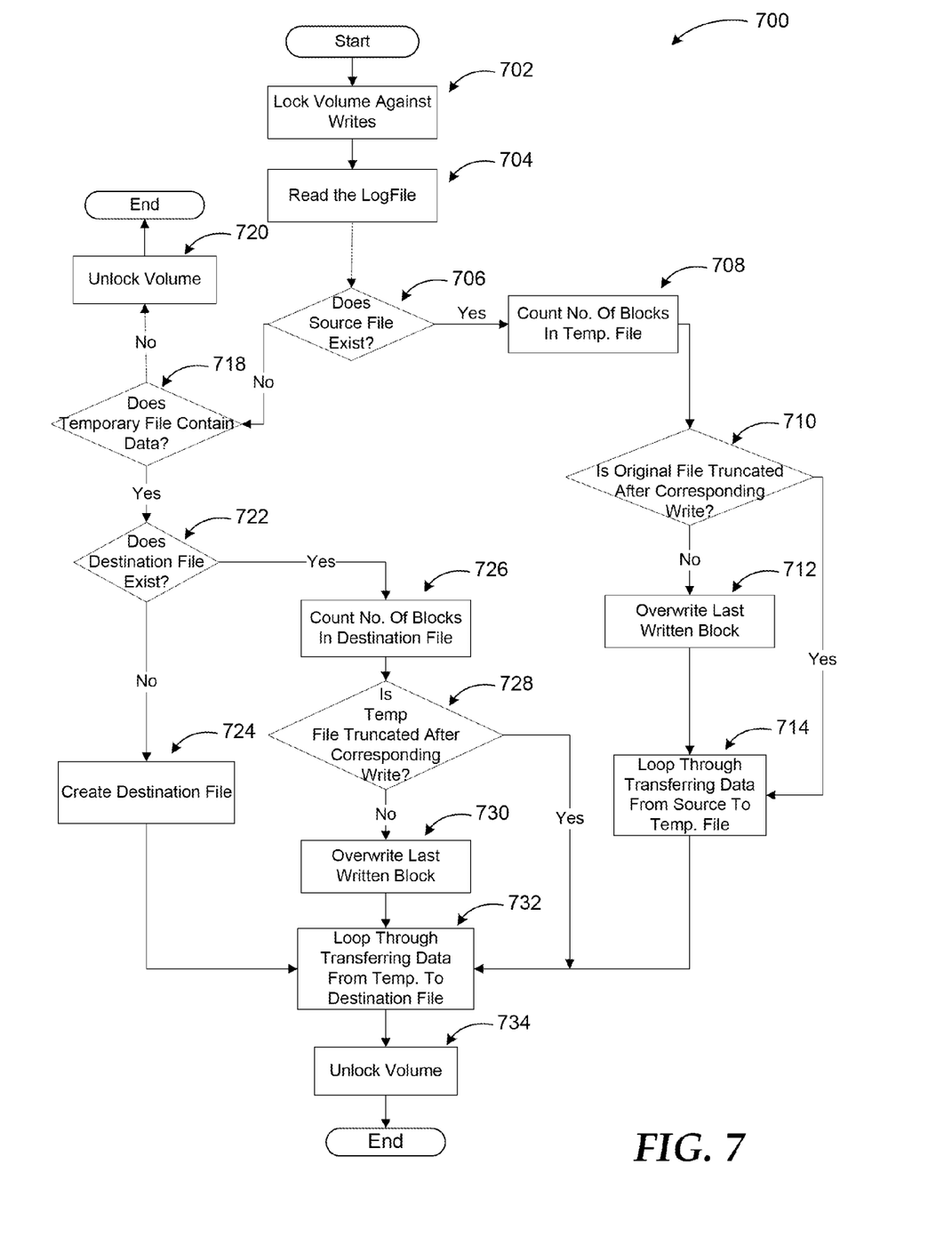
FIG. 7 illustrates a logic flow diagram of a recovery process from an interrupt during data transformation according to embodiments.

FIG. 7 illustrates a logic flow diagram of a recovery process from an interrupt during data transformation according to embodiments. Process 700 may be implemented as part of a data recovery module in a file processing application.

Process 700 is for recovery of data following a mid-transaction interruption of the transform process of FIG. 6 and begins with operation 702, where a disk volume containing the data is locked against writes. Processing advances from operation 702 to operation 704. At operation 704, the log file created at the beginning of the transformation process is read to ascertain source file name and size information as well as transformation type.

Processing continues to decision operation 706 from operation 704, where a determination is made whether the source file exists or not. If the source file exists, processing continues to operation 708, where a number of blocks in the temporary file are counted.

Following operation 708, a determination is made at decision operation 710 whether the original file has been truncated after a corresponding write based on the number of blocks counted in the temporary file. If the original file has not been truncated, processing moves to operation 712, where the last data block is overwritten to prevent corruption, then to operation 714. If the original file has been truncated 710, processing advances directly to operation 714.

At operation 714, remaining data is transferred to the temporary file from the source file. Processing then moves to operation 732, where the data is transferred from the temporary file to the destination file, followed by operation 734, where the volume may be unlocked for further write operations.

Referring back to decision operation 706, if the source file does not exist, processing advances to decision operation 718. At decision operation 718, a determination is made whether the temporary file contains any data. If no data is found in the temporary file, processing moves to operation 720 for unlocking the volume, since the interrupted transformation operation appears to have been successfully completed prior to the interruption (i.e. all data transformed and written into the destination file).

If the temporary file is found to contain data at decision operation 718, processing proceeds to decision operation 722, where a determination is made whether the destination file exists. If the destination file does not exist, it is created in the next operation 724 and processing advances from operation 724 to operation 732 for transferring the data from the temporary file to the destination file.

If the destination file is found to exist at decision operation 722, processing moves to operation 726, where the number of blocks in the destination file are counted. Following operation 726, a determination is made at decision operation 728 whether the temporary file has been truncated after a corresponding write operation. If the temporary file has been truncated, processing moves to operation 732 for transfer of the remaining data to the destination file. Otherwise, processing advances to operation 730, where the last written block is overwritten to prevent corruption and then the remaining data in the temporary file transferred to the destination file at the subsequent operation 732.

The operations included in processes 600 and 700 are for illustration purposes. In-place data transformation and recovery from a mid-transaction interruption may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for performing in-place data transformation in a file system, the method comprising:
    performing a first transfer operation by transferring data from a source file to a temporary file in individual data blocks in a back to front fashion such that the temporary file is expanded and the source file is truncated after transfer of each data block;
    if a last data block of the source file is a truncated block, inserting filler data into the last data block such that the last data block becomes the same size as remaining data blocks of the source file;
    deleting the source file upon completion of the first transfer operation;
    performing a second transfer operation by transferring data from the temporary file to a destination file in individual data blocks in a back to front fashion such that the destination file is expanded and the temporary file is truncated after transfer of each data block; and
    deleting the temporary file and removing the filler data from a last data block of the destination file upon completion of the second transfer operation, wherein the data is transformed during one of: the first transfer operation and the second transfer operation.

2. The method of claim 1, further comprising:
    creating a temporary file; and
    creating a log file that includes at least one form a set of: a name of the source file, a size of the source file, a type of the transformation, and a direction of the transformation.

3. The method of claim 1, wherein performing the first transfer includes:
    reading a data block from the source file beginning at the end of the source file;
    expanding the temporary file to accommodate the read data block;
    writing the data block to the beginning of the temporary file;
    truncating the source file by removing the read data block from the end of the file; and
    repeating the reading, expanding, writing, and truncating operations for each data block in the source file such that the data blocks are written in reverse order in the temporary file until the source file is depleted.

4. The method of claim 1, wherein performing the second transfer includes:
    reading a data block from the temporary file beginning at the end of the temporary file;
    expanding the destination file to accommodate the read data block;
    writing the data block to the beginning of the destination file;
    truncating the temporary file by removing the read data block from the end of the file;
    repeating the reading, expanding, writing, and truncating operations for each data block in the temporary file such that the data blocks are written in reverse order in the destination file until the temporary file is depleted; and
    deleting the temporary file.

5. The method of claim 1, wherein the transformation includes at least one from a set of: encryption, decryption, compression, decompression, format change, and copy operation.

6. The method of claim 1, further comprising:
    inserting an End-Of-File (EOF) indicator to the end of the destination file upon completion of the second transfer operation.

7. The method of claim 1, wherein the filler data includes one of "0" bits and "1" bits.

8. The method of claim 1, wherein a size of the data blocks is determined by the underlying file system.

9. A system for performing in-place data transformation in a file system, the system comprising:
    a data storage device;
    a memory;
    a processor coupled to the memory, wherein the processor is configured to execute program modules for transforming data in a file stored in the data storage device, the modules including:
        a transformation module configured to:
            create a log file that includes a name of a source file, a size of the source file, a type of the transformation, and a direction of the transformation;
            create a temporary file;
            if a last data block of the source file is a truncated block, insert filler data into the last data block such that the last data block becomes a same size as remaining data blocks of the source file;

perform a first transfer operation by transferring data from the source file to the temporary file in individual data blocks in a back to front fashion such that the temporary file is expanded and the source file is truncated after transfer of each data block and the data blocks are written in a reverse order in the temporary file;

delete the source file and remove the filler data from a last data block of the destination file upon completion of the first transfer operation;

create a destination file;

perform a second transfer operation by transferring data from the temporary file to the destination file in individual data blocks in a back to front fashion such that the destination file is expanded and the temporary file is truncated after transfer of each data block and the data blocks are written in a reverse order in the destination file; and delete the temporary file upon completion of the second transfer operation, wherein the data is transformed during one of: the first transfer operation and the second transfer operation.

10. The system of claim 9, further comprising:

a recovery module configured to:

read the log file and determine a number of blocks in the temporary file following a mid-transaction interruption;

determine whether the source file has been truncated following a corresponding data block transfer;

if the source file has been truncated following the corresponding transfer, continue performing a remainder of the first and second transfer operations; and if the source file has not been truncated following the corresponding transfer, continue performing the remainder of the first and second transfer operations by overwriting a last transferred data block prior to the interruption.

11. The system of claim 10, wherein the recovery module is further configured to determine that the transfer operations to be completed if the source file does not exist and the temporary file does not contain any data following the interruption.

12. The system of claim 10, wherein the recovery module is further configured to create the destination file and perform the first and second transfer operations if the source file and the destination file do not exist and the temporary file contains data following the interruption.

13. The system of claim 10, wherein the recovery module is further configured to:

determine a number of data blocks in the destination file if the source file does not exist, the destination file does exist, and the temporary file contains data following the interruption;

determine whether the temporary file has been truncated following a corresponding data block transfer;

if the temporary file has been truncated following the corresponding transfer, continue performing a remainder of the second transfer operations; and if the temporary file has not been truncated following the corresponding transfer, continue performing the remainder of the second transfer operations by overwriting a last transferred data block prior to the interruption.

14. The system of claim 10, wherein the recovery module is further configured to lock the data storage device against any write operations before performing recovery and unlock the data storage device upon successful completion of the recovery.

15. A computer-readable storage medium with instructions encoded thereon for performing in-place data transformation in a file system, the instructions comprising:

creating a log file that includes at least one form a set of: a name of a source file, a size of the source file, a type of the transformation, and a direction of the transformation;

creating a temporary file;

if a last data block of the source file is a truncated block, inserting filler data into the last data block such that the last data block becomes the same size as remaining data blocks of the source file;

performing a first transfer operation by transferring data from the source file to the temporary file in individual data blocks such that an order of the data blocks is reversed in the temporary file, wherein the temporary file is expanded and the source file is truncated after the transfer of each data block;

deleting the source file upon completion of the first transfer operation;

creating a destination file;

performing a second transfer operation by transferring data from the temporary file to the destination file in individual data blocks such that an order of the data blocks is reversed in the destination file, wherein the destination file is expanded and the temporary file is truncated after the transfer of each data block; and deleting the temporary file and removing the filler data from a last data block of the destination file upon completion of the second transfer operation, wherein the data is transformed during at least one of: the first transfer operation and the second transfer operation.

16. The computer-readable storage medium of claim 15, wherein the instructions further comprise:

performing a data recovery operation in response to a mid-transaction interruption based on the source file size, a number of data blocks in the temporary file after the interruption, and a number of data blocks in the destination file after the interruption.

17. The computer-readable storage medium of claim 16, wherein the instructions further comprise:

overwriting a last written data block in the temporary file if the source file is not truncated after a corresponding write operation into the temporary file; and overwriting a last written data block in the destination file if the temporary file is not truncated after a corresponding write operation into the destination file.

* * * * *